Edward H. Lange
INVENTOR.

INVENTOR.
Edward H. Lange.

Dec. 12, 1939.  E. H. LANGE  2,183,354
AUTOMOBILE CONTROL APPLIANCE
Filed Dec. 30, 1935  4 Sheets-Sheet 3
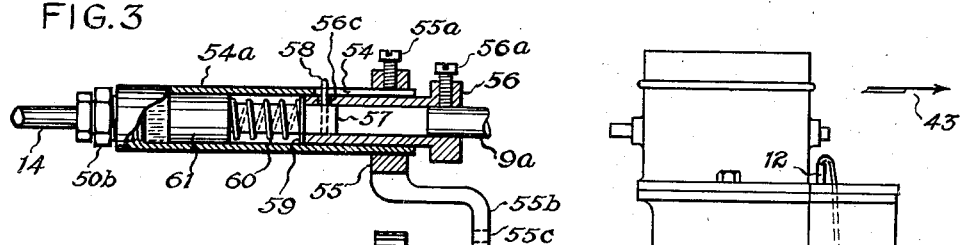
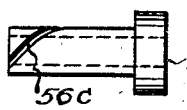
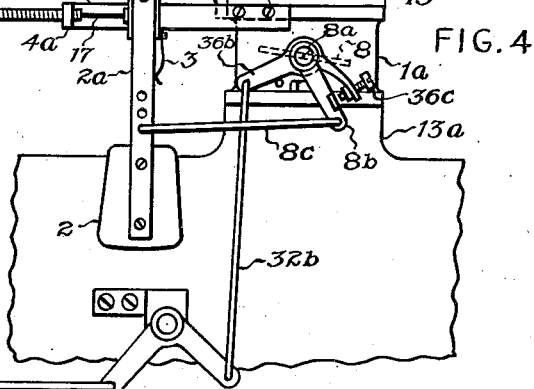
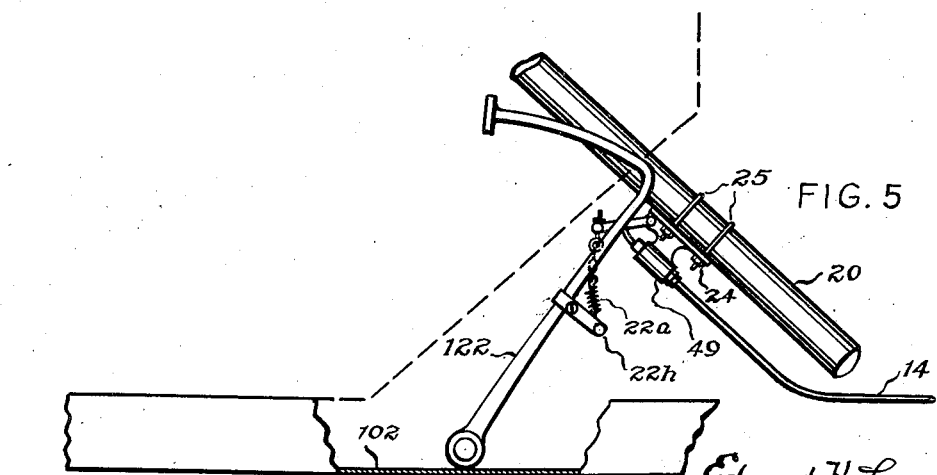
Edward H. Lange.
INVENTOR

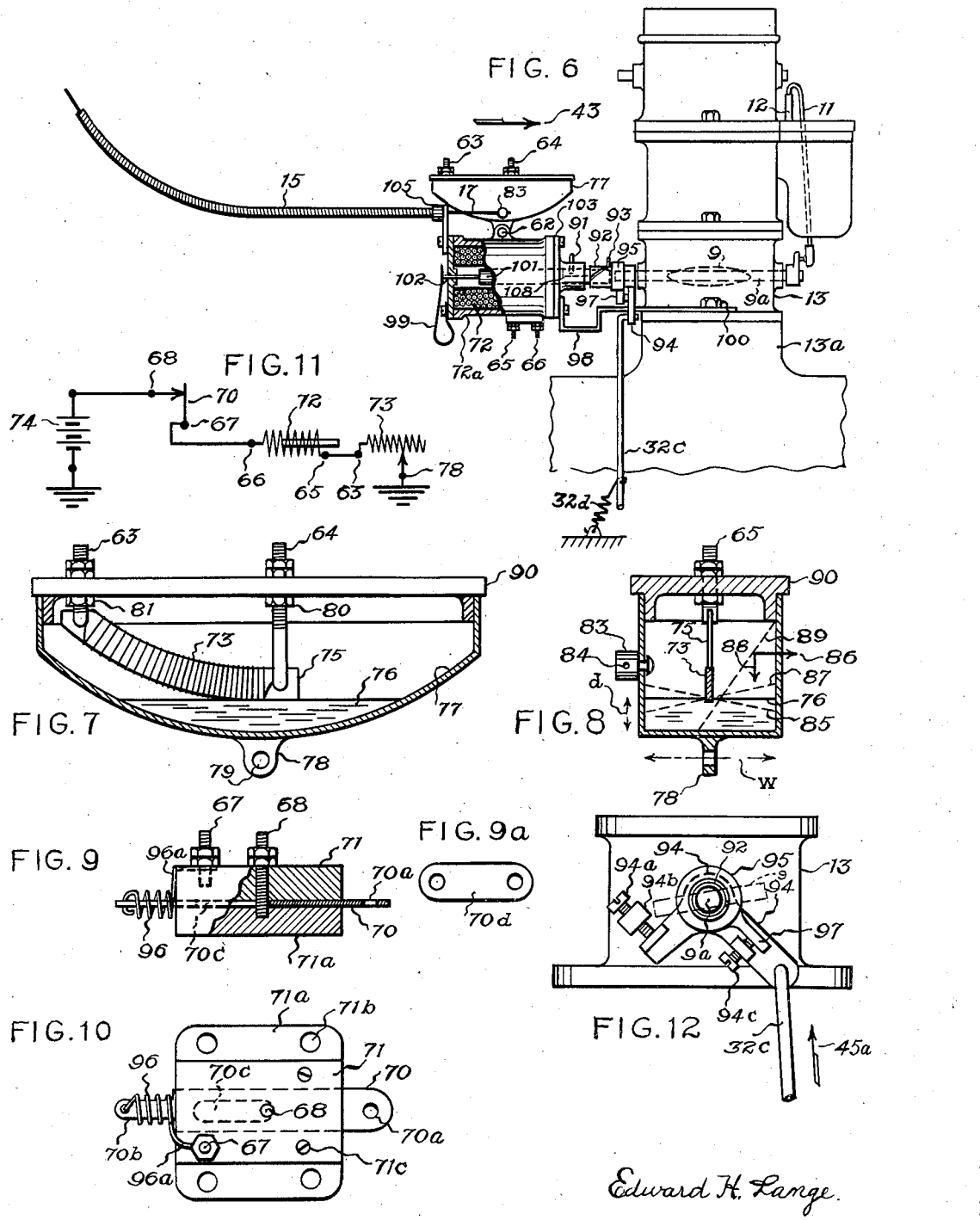

Patented Dec. 12, 1939

2,183,354

UNITED STATES PATENT OFFICE 2,183,354

AUTOMOBILE CONTROL APPLIANCE

Edward H. Lange, Baltimore, Md.

Application December 30, 1935, Serial No. 56,663

28 Claims. (Cl. 192—.01)

This invention relates to an automatic accelerator and power control mechanism for automobiles controllable by the brake control member or by a clutch control member, and an object of this invention is to provide certain improvements in devices of this character as subsequently described, and with reference for example to U. S. Patents 1,861,018, 1,915,099 and 2,016,864, of the present inventor.

In devices of this character heretofore described, modifications are required in car equipment or in linkages controlling engine-power by the brake control member or by a clutch control member, for various car models and for varying car structures and locations of equipment, necessitating costly changes in order to apply such a device under such varying conditions. An object of this invention is to provide an appliance having a high degree of applicability under such varying conditions, substantially independent of these changes.

Another object of this invention is to provide an appliance readily applicable to types of car equipment commonly used, having suitable characteristics for reducing engine-power from an excess amount to the amount required for idling the engine, by a very small initial displacement of the brake control member, insufficient for application of the brakes, and by a very small loading of the brake control member.

Also, in devices of this character heretofore described, available operating forces for power control by an intertia-motive governor responsive to car movements, are limited by the amount of the mass which is acted upon. Large operating forces are attainable only with undesirably large masses, when used directly, and masses smaller than a certain minimum are not usable for positive operation because of a minimum of frictional loading necessarily present. Another object of this invention is to provide a compact inertia-motive controller responsive to car movements, by which control forces are obtainable many times larger than are produced by inertia directly.

These objects, and others hereafter described, are better understood by reference to the specification, and to the appended claims.

In the drawings, Fig. 1 shows in part, a side view of one form of power-control appliance, with inertia-motive governor, manifold-insert unit, valve-motor, and part of a flow-transmission means connected with the valve-motor.

Fig. 3 shows a modified form of valve-motor, and Fig. 3a shows a further detail of the same modified form.

Fig. 4 shows an assembly of the appliance, in part, including a modified form of valve-motor as shown in Fig. 3.

Fig. 5 shows one form of mounting of a flow-control mechanism, and connection to a brake control member.

Fig. 6 shows an assembly of part of another form of appliance, with an inertia-motive controller of modified form, and details of another modification of valve-motor.

Fig. 7 shows a sectional side view of the inertia-motive controller of Fig. 6.

Fig. 8 shows in diagram form a sectional end-view of the inertia-motive controller of Fig. 6, and variations of position of the surface of the electrically conducting liquid, in relation to the resistance element.

Fig. 9 is a partial sectional side-view of another flow-control mechanism, for use with the modified valve-motor of Fig. 6.

Fig. 10 is a plan view of the same flow-control mechanism of Fig. 9.

Fig. 11 shows in diagram form connections of the modified forms of flow-control mechanism, valve-motor and inertia-motive controller of Fig. 6.

Fig. 12 shows in further detail means associated with the appliance of Fig. 6 for connection to the foot-accelerator of a motor vehicle.

Figure 1:
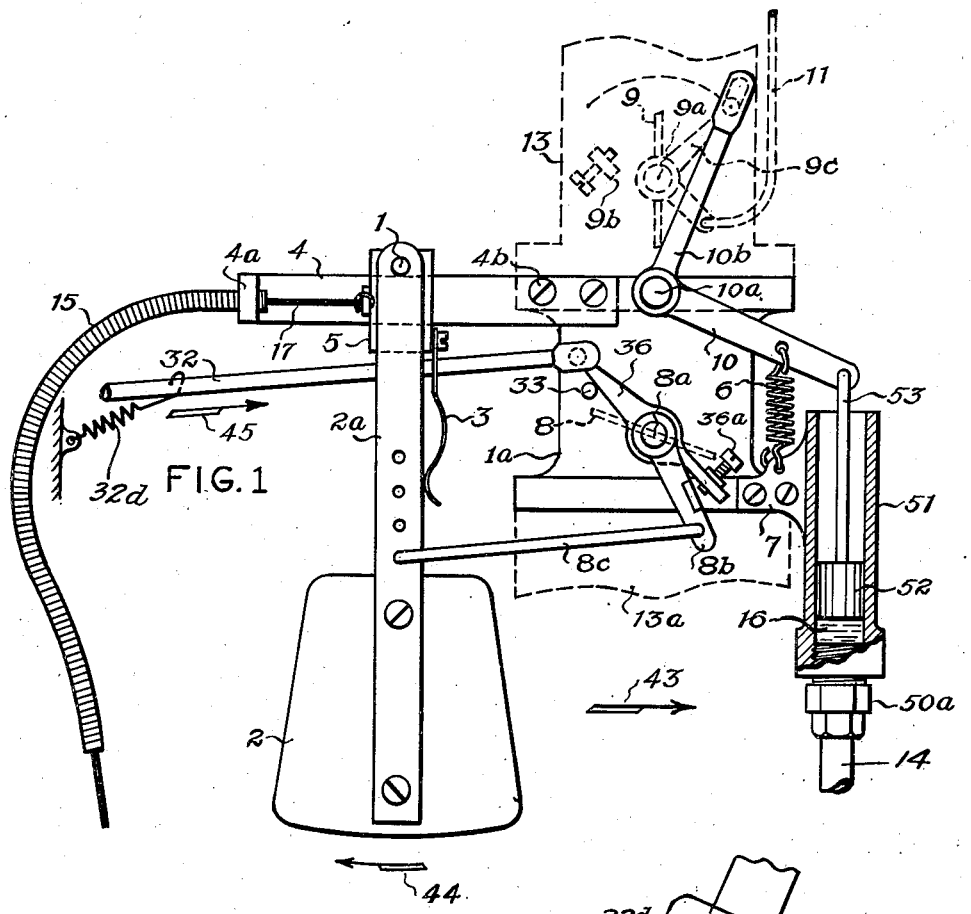

Referring to Fig. 1, the manifold-insert unit is shown at 1a, with the throttle shaft 8a and throttle 8, the member 36 being free to turn about the shaft 8a, and having the adjusting screw 36a. The arm 8b is rigidly fastened to the shaft 8a, and connected with 8b is the link 8c which connects with the pendulum 2 at the support 2a. The pendulum is pivoted at 1, and held by the slide member 5, which is movable along 4 by the cable wire 17 of the cable housing 15. The carburetor is shown at 13 by dotted lines, also the manifold is shown at 13a, each in relative position after insertion of the manifold-insert unit 1a of the appliance, it being assumed that before application of the appliance the carburetor 13 rested directly upon the manifold 13a. Attached to the unit 1a, is the valve-motor 7, having the arms 10 and 10b which are fixed together and pivoted at 10a upon the unit 1a. The construction of the arm 10b is such that it can be operatively attached to the arm 9c of the carburetor, which controls the power-controlling throttle valve 9 fastened to the shaft 9a. At 9b is shown a stop limiting the closure of the throttle 9. At 32 is shown a part of the usual foot-accelerator mechanism, it being understood that the rod 32 is normally moved as shown by the arrow 45 to increase the engine-power, and that a spring, 32d pulls the rod in a direction the opposite of 45, in a manner well understood. The rod 32 is assumed to have been originally attached to the arm 9c, to operate the throttle 9, and the arm 36 is so constructed that the rod 32 can be similarly connected to it, to operate the throttle 9, the stop 33 being provided upon the unit 1a, and the screw 36a being available to adjust the arm 8b in relation to 36. The throttle 9 is held in a normal open position as shown, by the spring 6 of the valve-motor. Attached to 10 is the rod 53 and piston 52 which is movable within the cylinder 51 by a liquid, for example by oil 16. At 14 is the conduit or flow-transmission means for 16, attached to 51 by the fastening means 50a. The cable housing 15 is fastened upon the slide 4 at 4a, the slide being mounted upon the unit 1a as shown for example, by screws 4b. A cable wire such as 17 is usually provided for a hand-throttle control either upon the dash-board or upon the steering wheel, and when present, this same wire can be used for attachment to 5, to serve the purpose of 17. The longitudinal axis of the vehicle is assumed parallel to the arrow 43, which indicates the direction of the front of the vehicle.

Figure 2:
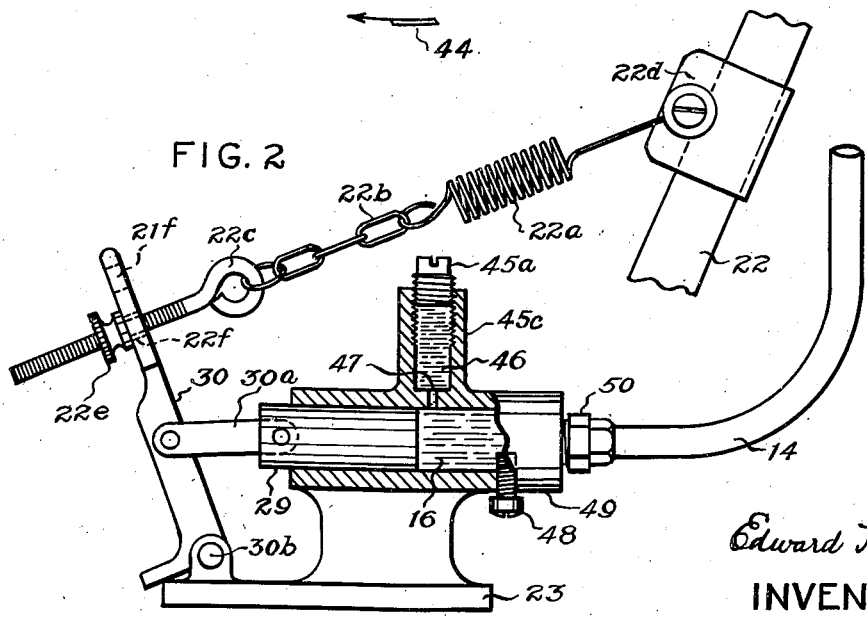
Fig. 2 shows the remaining part of the flow-transmission means of Fig. 1, a flow-control mechanism, and a connection with a control member.
Figure 2A:
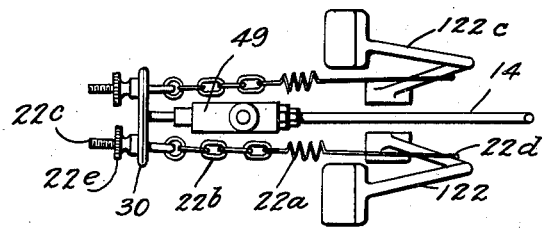
Fig. 2a shows in diagram form the flow-control mechanism of Fig. 2 connected with a clutch control member and with a brake control member.

Referring to Fig. 2, at 23 is shown a flow-control mechanism, for connection to the brake control member or the clutch control member, or to each of these members, as further illustrated in Fig. 2a, in which 122 is a brake control member which is moved to the right when applying the brakes, and 122c a clutch control member which is moved to the right when disengaging the clutch of the motor vehicle and disconnecting the driving and driven mechanism. The mechanism 23 has a cylinder 49 within which the piston 29 is movable. The flow-transmission means of Fig. 1 terminates in 49, being fastened thereto by 50. Connected with 49 is the reservoir 45c, and the opening 47 between 45 and 49. The plug 45a is screwed into 45c. The arm 30 is pivoted at 30b, and connected to 29 by the link 30a. One end of the arm 30 has openings such as 22f and 21f, providing means for a screw adjustment such as 22c and 22e connectable in a positive manner by the chain 22b and spring 22a to a control member attachment 22d, attachable to a control member 22, which may be a brake control member, or a clutch control member. By connections such as 22a, 22b, 22c, 22d, and 22e, the arm 30 of the flow-control mechanism 23 can be connected separately to a clutch control member and to a brake control member, and separately adjusted. At 48 is shown a stop limiting the travel of 29.

The only load upon the valve-motor is that of the throttle shaft 9a and the connected member 11 for operation of a piston mechanism usually provided in carburetors for a temporary flow of engine-motive fluid, and that of the spring 6 for opening 9 when no force is applied to 29. This load is relatively small in relation for example to that usually controlled by a foot operated brake control member or clutch control member. The spring 22a is sufficiently stiffer than 6, so that only small stretching of 22a takes place until 29 is limited by the stop 48, after which 22a provides ample flexibility for further movement of 22. It will be understood that the size of valve-motor and of flow-control mechanism are illustrative, and that the displaced volume of liquid 16 necessary to close 9, and to move 29 against the stop, may take place in a very small movement of 29, by suitably proportioning the size and motion of 52 in relation to the size and motion of 29, as will be evident from a modified form of valve-motor shown in Fig. 3. Liquid may be applied at 45c, and contact between the liquid and 45a maintained by the screw connection of 45a and 45c. Assuming that the control member 22 is a brake control member, for example, normally returned to its inoperative position by a spring not shown, but in a manner well understood, the screw 22e can be adjusted so that there is not slack in the connection 22b and 22a, so that a very small movement of the brake control member insufficient for application of the brakes suffices to close the throttle valve 9. This is accomplished by a relatively light touch upon the brake control member, and operative in the small interval of lost motion commonly present in brake mechanisms. Assuming that the control member 22 controls a clutch upon the motor vehicle for engaging or disengaging driving and driven mechanism of the vehicle, the slack of the connection 22b and 22a can be adjusted by 22e so that operation of 29 takes place in relation to the clutching and declutching operation of 22. Thus in the case of a foot operated clutch, the slack is adjusted so that as the clutch disengages the throttle 9 closes to the idling position, and as the clutch engages the throttle 9 opens. The power of the engine is automatically carried by the inertia-motive governor, one form of which is shown in Fig. 1, and which may be completely disengaged by moving the slide member 5 to the extreme right-hand position.

Referring to Fig. 3, a modified form of valve-motor is shown which not only operates with a small piston displacement, but has greater applicability because it is directly connectable upon the throttle shaft 9a of a carburetor, and attachable to the unit 1a. At 14 is shown a part of the flow-transmission means connected by 50b to the cylinder 54a. The piston 61 is movable within 54a, and the stem 57 is an integral part of the piston. At 56 is a rotor, fastened to the shaft 9a, for example by a screw 56a, and a part of the rotor fits loosely within the cylinder 54a, the same part having an axial opening in which the stem 57 is freely slidable. At 54 is an axial slot in which the pin 58 which is secured into the stem 57, can slide. By means of the slot 54, the piston 61 is prevented from turning about its longitudinal axis in the cylinder 54a, but is free to slide axially. Between the piston 61 and rotor 56, is the washer 59 and spring 60. At 56c is a slot, having a helical relation to the axis of 56, as further shown in Fig. 3a. The yoke member 55 is attachable by means of the extension 55b and holes 55c to the unit 1a, and the cylinder 54a is supported by the yoke, and fastened thereto, for example by screw 55a. By a relatively small flow of liquid into the cylinder 54a, the piston 61 is sufficiently displaced to turn the rotor 56, to close the throttle 9 to idling position.

In Fig. 4, a manifold-insert unit, inertia-motive governor, and valve-motor are shown, with the carburetor 13 and manifold 13a. In this instance, the carburetor throttle shaft is longitudinal instead of transverse, the valve-motor being equally applicable in either case, and the conduit 14 for transmitting the flow is readily connectable between the valve-motor and the flow-control mechanism, independent of intervening equipment upon the vehicle. The advantage of a flow-transmission and of a flow-control means for controlling the throttle 9, or the engine-power in a power-control system of this character, is that there is great flexibility of application. For example, intervening equipment usually requires many modifications in any linkage used in place of a flow-transmission, in order to attain the required control upon different vehicles with variously located equipment. A further advantage is that high sensitivity to small displacements of a control member for closing a throttle to reduce engine-power to the amount required for idling, is attainable as a fixed characteristic of an appliance, independent of numerous special adjustments of varying types of linkages. A conventional foot-accelerator mechanism is shown at 32a and 32b, it being understood that 32a is normally returned to an undisplaced position by a spring 32d, and is displaceable as shown by arrow 45 to open throttle 8.

In Fig. 5 is shown a flow-control mechanism mounted by means of fasteners 25 and 24 to the steering-column 20. At 122 is a conventional brake pedal, it being understood that the pedal is operatively connected to the brakes of the vehicle, and returned to a normal position when the brakes are not in use. At 22h is a pedal attachment, connected by 22a to the flow-control mechanism. In similar manner, a conventional clutch pedal can also be connected to the flow-control mechanism.

Figures 7A, 8A:
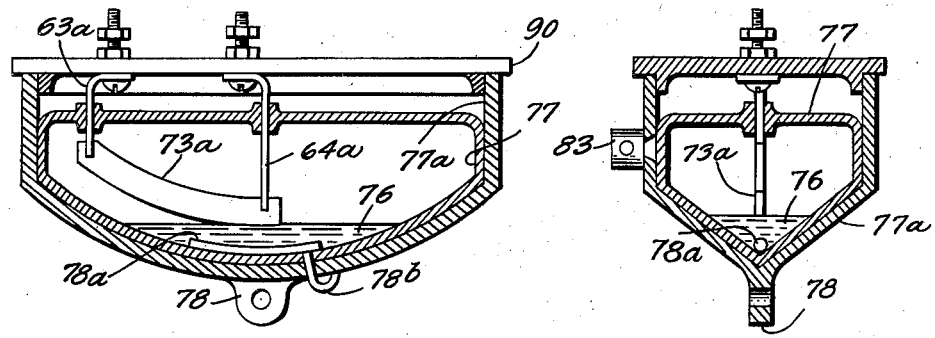
Fig. 7a shows a sectional side view illustrating modifications of the form of inertia-motive controller shown in Fig. 7.
Fig. 8a shows a sectional end view of Fig. 7a, and illustrates modifications of the form of inertia-motive controller of Fig. 7.

Referring to Figs. 6, 7, and 8, another form of valve-motor, and inertia-motive governor responsive to vehicle movements is shown. At 72 is a winding forming a solenoid within the magnetic enclosure 72a, the terminals of the wing being connected to 65 and 66. The end-plate 103 has a bearing through which the plunger 101 can slide, and secured to the end-plate are supports, such as 98, which can be fastened under bolts, as shown at 100. Secured to the carburetor shaft 9a is a rotor 95, having a projection 97, and adjacent 95 is an arm 94, free to turn about the shaft 9a and to engage the projection 97. The sleeve 92 is an integral part of the rotor 95, and the plunger 101 terminates within the sleeve, and is free to slide within the sleeve. Within the plunger, at the end-plate 103, is a slot 108, and secured in the bearing of the end-plate 103 is a pin 91 which fits into the slot 108, permitting axial motion of the plunger, but preventing rotation of the plunger about its axis. At 93 is a pin secured to the plunger, and free to slide in a helical slot in the sleeve 92, the slot being similar to that previously described in Fig. 3a for the rotor 56. Fixed to the opposite end of the plunger is a non-magnetic rod 102, which slides freely through the end-plate, and engages the spring 99. By means of 99, the plunger 101 when not energized by the winding is moved to close the throttle 9 to idling position. At 15 is a cable-housing through which the cable wire 17 passes, the cable wire being connected to the swivel 83 attached to the housing 77 of the inertia-motive governor. The housing 77 is pivoted at 62, so that it can be turned either forward, that is in the direction of the arrow 43, or backward, by means of the cable wire 17. In the illustration of Fig. 6, the axis of the solenoid is parallel with the longitudinal axis of the vehicle, however it is understood that regardless of the axis of the solenoid and carburetor shaft, the housing 77 of the inertia-motive governor is mounted so that it can be rotated forward or backward in relation to the forward and rearward direction of the vehicle by the cable wire 17. By means of the usual foot-accelerator mechanism, shown in part at 32c, the engine-power can be selectively increased at any time. In Fig. 7 the inertia-motive governor is illustrated in further detail. Within the metallic housing 77 is the electrically conducting liquid 76, and for purposes of illustration the liquid 76 is shown in direct contact with the housing 77, for example mercury within an iron container. At 90 is an insulating cover, to which the electrodes 64 and 63 are attached. Connected between 64 and 63 is a resistance element 73, supported for example as shown, by an insulating core 75. The part of the housing 77 within which the liquid 76 rests, is curved, to conform to an arc of a circle, and similarly the resistance element 73 is concentrically shaped. By this means, the geometrical shape of the liquid 76 as affected by changes in grade upon which the vehicle rests or moves, is essentially unchanged for grades ordinarily encountered, and the surface of the liquid 76 is tangent to a concentric circular arc of the resistance element. At 78 is a projection upon the housing 77, and at 79 is a hole in the projection, for pivoting the housing so that it can be rotated in a forward or backward direction with reference to the vehicle. The form of resistance element may be a winding, as shown in Fig. 7, at 73, between 64 and 63, the initial contact between resistance element and liquid 76 being adjustable by the screw adjustment at 80 and 81. An alternate form of resistance element is illustrated in Fig. 7a, the element consisting of a continuous strip of resistance material as shown at 73a between the electrodes 63a and 64a. By means of the cable wire 17, the resistance of a circuit between 78 which is electrically connected to 76, and the terminal 63, is adjustable while the vehicle is in motion, also by tilting the housing 77 to the extreme forward position the circuit can be completely opened, and the controller disengaged. In Fig. 8, a sectional end view of the housing is shown, the liquid surface being at 76 when a transverse axis of the vehicle is horizontal. At 87 and 85 are shown respectively the liquid surface when the vehicle is transversely inclined, from the right side upward toward the left side, and from the right side downward toward the left side. For such transverse inclinations as are ordinarily encountered in rectilinear motion of the vehicle, and because of uneven surface of the road, the contact between the liquid 76 and the resistance element 73 is not permanently broken. An important feature of this form of controller is the response of the liquid 76 to transversely directed accelerations when the controller is constrained to move in a curved path, which provides means for interrupting the contact between the liquid 76 and the resistance element, when these accelerations exceed a predetermined amount. For example, at 89 is shown a liquid surface out of contact with the resistance element, the centrifugal force 86 being excessive upon a particle of the liquid in relation to the gravity force 88. The resistance element is centrally located within the section of Fig. 8, and response of the liquid 76 for interrupting the contact with the resistance element is symmetrical with respect to right-hand and left-hand curves in which the vehicle moves. The sensitivity of the controller for interrupting contact in relation to changes of the normal surface 76 caused by excessive transverse acceleration of the vehicle upon a curve, can be adjusted to the desired amount, by proportioning of the depth $d$ in relation to the width $w$ of the normal surface at 76, and the extent of immersion of the resistance element 73. Although the operation of the controller has been illustrated with reference to a rectangular transverse section of the conducting liquid, it will be understood that the section is not limited to this shape, other shapes for example a triangular section as illustrated at 76, Fig. 8a, with gradually sloping sides forming a trough, are usable. At 83 is a swivel having the hole 84, for attachment of the cable wire 17.

In Fig. 9 and 10, an insulating member 71 is grooved to permit sliding therein of the switch member 70, the insulating member 71 being secured to the insulating base 71a, for example by the screw 68, which passes through the slot 70c in 70. Additional screws such as 71c serve to fasten 71 to 71a. The terminal 67 is connected by the spring 96, at 96a, to the end 70b of the switch member 70, so as to electrically connect 70 and 67. The slot 70c is sufficiently wider than 68, so that electrical connection between 68 and 70 takes place only when the spring 96 holds 70 against 68. By means of holes 71b, the insulating base 71a can be suitably mounted, either to the steering-column or the chassis, as suggested in Fig. 5, or otherwise. At 70d, Fig. 9a is a link of insulating material, for connection with 70a. By means of an adjustable conection such as described in Fig. 2, 22a and 22b, the link 70d is connected to the brake control member, and similarly to the clutch control member.

In Fig. 11, a diagram of electrical connections of the valve-motor, inertia-motive electric current controller, and switch member, with an electric power source is shown. At 74 is an electric power source, for example, as a storage battery commonly provided upon motor vehicles. The switch member 70, solenoid terminals 65 and 66, and controller terminals 63 and 78, are connected in series with the storage battery 74. Although the inertia-motive electric current controller has been illustrated for an instance in which the housing 77 is in direct contact with the conducting liquid 76, the housing being grounded to the metallic frame of the vehicle, it will be understood that the housing 77 may also be of insulating material, for example of glass, and connection with the liquid 76 obtained by an electrode instead of by 78. It will also be evident that the complete enclosure of the controller, that is the housing 77 and insulating cover 90, may consist of a single enclosure of glass, in which the terminals 63 and 64 are sealed together with an electrode for connection with mercury, the entire enclosure being evacuated to obtain greater uniformity of the conducting surface of the mercury and freedom from deterioration. In this instance, a housing similar to 77 is provided as a container for the glass enclosure, and for mounting and adjustment of the controller. These modifications of the inertia-motive electric current controller are illustrated in Fig. 7a and Fig. 8a. Referring to these figures, the housing 77 consists of a single enclosure of glass as shown, containing the liquid 76. Connection with the liquid 76 is obtained by means of the electrode 78a, which is electrically connected by the lead 78b to the metallic container 77a.

In Fig. 12, details of an arm 94 for connection with the foot-accelerator mechanism, are shown. At 94a and 94b are shown a screw adjustment and stop, as commonly provided upon the carburetor 13 for limiting the closure of the throttle 9. An arm 94, for use with the foot-accelerator 32c is mounted upon the throttle-shaft 9a so as to turn freely about it, and to engage the screw 94a. The arm 94 carries an adjustment screw 94c for engaging the projection 97 of the rotor sleeve 92. By this means the rotor can be adjusted, and the throttle 9 selectively opened by the foot-accelerator.

In operation, the appliance is selective. By moving the cable wire 17 to the extreme right, the automatic control is disengaged. The extent to which the power is set in excess of the power required for idling, is controlled by displacement of the cable wire 17 to the left. The inertia-motive governor automatically increases the power upon up-grade, and decreases the power upon down-grade. The foot-accelerator can be used at any time to increase the engine-power, if desired. With the conventional system of power control, in which the foot-accelerator must be used continuously while driving, continuous holding of the foot-accelerator frequently results in fatigue, especially over a long period, and because of the fixed foot position required. It is also known that a substantial percentage of motor vehicle accidents are caused by the action of a human reflex known as the extensor thrust, which reflex frequently compels an operator when suddenly confronted with danger to grasp the steering-wheel tightly, and by a self-righting movement press down hard upon the foot-accelerator. With the automatic power control, manual control is periodic, and carried out with the brake control member, the same member necessary for sudden stopping. There is thus no need for sudden distinction between two controls. It has been found that with the system of control here described, use of the foot-accelerator is greatly reduced. By means of a light touch upon the brake control member, the power is reduced to the idle power, without application of the brakes, and by further motion of the same member, the brakes are applied. Automatic acceleration is accomplished in the forward direction, as the clutch is let in, forward acceleration of the vehicle automatically increasing the engine-power, either through the backward impulse of the pendulum, or the backward impulse of the conducting liquid. Upon up-grade, when the vehicle is started from rest, use of the foot-accelerator is not necessary, when letting in the clutch.

Figure 13:
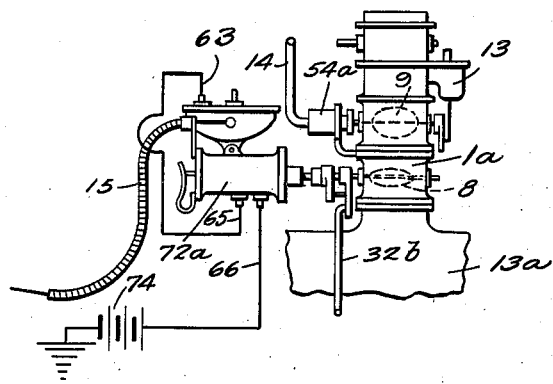
Fig. 13 illustrates in diagram form an inertia-motive controller of the type shown in Fig. 6 controlling the throttle of a manifold-insert unit, in combination with a liquid-flow type valve-motor for controlling the carburetor throttle.

The form of valve-motor and inertia-motive controller shown in Fig. 6, can also be used in combination with a manifold-insert unit, and liquid-flow type of valve-motor of Figs. 1 and 4. In this instance, the switch member 70 is omitted from the electrical connections, the terminal 66 being connected directly to 74. A liquid-flow type valve-motor as in Fig. 1 or 4, and flow-control mechanism as in Fig. 2 is then used for controlling the carburetor throttle, and a valve-motor and inertia-motive controller of the type shown in Fig. 6 is then substituted for the pendulum control of the throttle in the manifold-insert unit. This combination is illustrated in Fig. 13.

It will be evident that other changes can be made in the construction and arrangement of parts without departing from the spirit of my invention, as further set forth in the appended claims, and I do not limit myself to the form or arrangement shown.

What is claimed is:

1. A vehicle control appliance for attachment to an internal-combustion motor vehicle, said appliance having a manifold-insert unit for insertion between the carburetor and the intake manifold, a throttle valve in said unit, a governor upon said unit for controlling said throttle valve, means for controlling said governor, a valve-motor attached to said unit and operatively attachable to the power-controlling throttle valve of said carburetor, and a liquid-flow establishing and transmitting mechanism readily connectable between said valve-motor and the brake control member or the clutch control member, or between the valve-motor and each of said members, for controlling power of the internal-combustion motor by either of said members.

2. In a motor vehicle, the combination with a brake control member and an engine-motive fluid controller, of mechanism for selectively setting the flow of engine-motive fluid in excess of the amount required for idle engine power, and a liquid-flow controlling mechanism for operatively interconnecting said brake control member and said engine-motive fluid controller, to selectively reduced said excess flow by relatively small initial displacements of the brake control member.

3. In combination with claim 2, inertia-governor means for automatically varying the amount of said excess flow of engine-motive fluid.

4. In a motor vehicle, the combination with a clutch control member and an engine-motive fluid controller, of mechanism for selectively adjusting the flow of engine-motive fluid in excess of the amount necessary for the idle power of the engine, and a liquid-flow establishing and transmitting mechanism for operatively interconnecting said clutch control member and said engine-motive fluid controller, to reduce said excess flow upon disengagement of a clutch by said clutch control member.

5. In combination with claim 4, inertia-motive governor means for varying said excess flow in response to the forward and rearward inclination of the motor vehicle, and in response to longitudinal acceleration of said vehicle.

6. In a motor vehicle, the combination with a clutch control member and a carburetor, of a vehicle control appliance for attachment to said motor vehicle, said appliance having an inertia-motive governor for controlling the power of the vehicle motor, a valve-motor mechanism operatively connectable with the power-controlling throttle valve of said carburetor, a flow-controlling mechanism positively and operatively connectable with said clutch control member, and a flow-transmission means interconnecting said mechanisms, for readily applying upon a motor vehicle a control of said throttle valve by the clutch control member, independent of obstructing objects upon said vehicle between said throttle valve and the clutch control member.

7. In a motor vehicle having a brake control member, a clutch control member, a carburetor, an inertia-motive governor for controlling power of the vehicle motor, and mechanism for controlling the power-controlling throttle valve of said carburetor by said brake control member or said clutch control member, a current-transmitting means associated with said mechanism, for facilitating application of said mechanism upon said vehicle, and for providing applicability of said mechanism to a motor vehicle unaffected by objects upon the vehicle otherwise impeding an operative connection between said members and said throttle valve.

8. A control appliance for internal-combustion motor vehicles, said appliance having a valve-motor for attachment to the power-controlling throttle of the carburetor for opening said throttle, spring means for closing said throttle, an electric resistance-controller for controlling said valve-motor, a member for connection with the foot-accelerator of the motor vehicle selectively operable thereby for increasing the opening of said throttle, a switch mechanism for connection with the brake control member or the clutch control member, or with each of said control members, and circuit connections between the valve-motor, the electric resistance-controller and said switch mechanism for connection with an electric power source upon the vehicle.

9. In combination with claim 8, inertia-motive means for varying the resistance of said electric resistance-controller in response to the forward and rearward inclination of the vehicle, in response to longitudinal acceleration of the vehicle, and in response to transverse acceleration of the vehicle.

10. A vehicle control appliance for application upon an internal-combustion motor vehicle, said appliance having a valve-motor for connection to the power-controlling throttle valve of the carburetor, an inertia-motive electric current controller for controlling said valve-motor in response to forward and rearward inclination of the vehicle, in response to longitudinal acceleration of the vehicle, and in response to transverse acceleration of the vehicle; a switch mechanism for connection to the clutch control member or the brake control member, or to each of said members, circuit connections between the valve-motor, the inertia-motive electric current controller and the switch mechanism for connection to a source of electric power upon said vehicle, and means for selectively adjusting or disengaging said inertia-motive electric current controller.

11. In a motor vehicle, in combination, a carburetor, a brake control member, a manifold-insert unit for connection between the intake manifold and said carburetor, a throttle in said unit, means for controlling said throttle including an inertia-motive electric current controller and an electrically operable valve-motor, a liquid-flow operable valve-motor connected with the power-controlling throttle valve of said carburetor for controlling said throttle valve, and a liquid-flow control mechanism operatively interconnecting the brake control member and said liquid-flow operable valve-motor.

12. A control-appliance for attachment to an internal-combustion motor vehicle, said appliance having a primary control mechanism including an inertia-governor for regulating the flow of engine-motive fluid, and a secondary control mechanism controllable by the clutch-control member or the brake-control member, and controlling the flow of engine-motive fluid by either of said members in a series relation with the control provided by said primary control mechanism, said inertia-governor having an electromagnetic valve-motor and an inertia-motive electric current controller for said valve-motor.

13. In a motor car, an inertia controller-appliance for varying the amount of electric current in proportion to amounts of forward and rearward inclination of the motor vehicle, said appliance having a liquid-enclosing member, an electrically conducting liquid in said member, an electrical resistance element mounted within said liquid-enclosing member normally in contact with said conducting liquid, and circuit connections from a source of electric power, including the conducting liquid and said resistance element.

14. In combination with claim 13, means for selectively controlling the forward and rearward inclination of said liquid-enclosing member.

15. In combination with claim 13, a fluid-control valve, and electromagnetic motor means for operating said valve, operatively included in said circuit connections.

16. In a motor vehicle, an inertia controller-appliance for varying the amount of an electric current in proportion to amounts of longitudinal acceleration of the vehicle, said appliance having a liquid-enclosing member, an electrically conducting liquid in said member, an electrical resistor-element mounted within said liquid-enclosing member normally in contact with said conducting liquid, and circuit connections from a source of electric power, including the conducting liquid and said resistor-element, whereby electric-circuit resistance is usefully modified in a continuous graduated manner in a proportion to the amount of said acceleration.

17. In a motor vehicle, an inertia controller-appliance for controlling electric current, said appliance having a liquid-enclosing member, an electrical conducting liquid within said member, an electrical conducting element mounted within said liquid-enclosing member capable of contacting said conducting liquid, and circuit connections from a source of electric power, including the electrical conducting liquid and said electrical conducting element, whereby electric current is modified in response to forward or rearward inclination of the vehicle, or to longitudinal acceleration of the vehicle, or to transverse acceleration of the vehicle.

18. In a motor-vehicle, an engine for propelling said vehicle, an engine-motive fluid controller, a clutch control member for controlling engagement and disengagement of the engine with the vehicle, and mechanism for controlling the engine-motive fluid controller to provide a necessary excess of engine-power above the amount required for idling said engine, for starting the vehicle, including a fluid-pressure control means controllable by said clutch control member, and an inertia-control means responsive to longitudinal inclination of said vehicle.

19. In a motor-vehicle, an engine for propelling said vehicle, a clutch control member for controlling engagement and disengagement of the engine with said vehicle, and mechanism for regulating flow of engine-motive fluid to provide a necessary excess of engine-power above the amount required for idling the engine, for starting the vehicle, said mechanism including a fluid-pressure control means controllable by said clutch control member, and inertia means responsive to longitudinal inclination of the vehicle.

20. In a motor-vehicle, an engine for propelling the vehicle, an engine-motive fluid controller, a clutch control member for controlling the engagement and disengagement of the engine with said vehicle, and mechanism for controlling the engine-motive fluid controller to provide a necessary excess of engine-power above idle engine-power, for starting the vehicle, including an inertia responsive electric-current control means controllable by said clutch control member.

21. In a motor-vehicle, an engine for propelling the vehicle, an engine-motive fluid controller, a clutch control member for controlling engagement and disengagement of the engine with said vehicle, and a mechanism responsive to forward acceleration of said vehicle for controlling said engine-motive fluid controller, to establish a temporary excess of engine-power as the vehicle starts, said mechanism including an electric-current controlling means controllable by said clutch control member, for regulating said temporary excess engine-power.

22. In a motor-vehicle, an engine for propelling said vehicle, an engine-motive fluid controller, a clutch control member for controlling engagement and disengagement of the engine with said vehicle, a mechanism responsive to forward acceleration of the vehicle for controlling said engine-motive fluid controller, to establish a temporary excess of engine-power above idle engine-power as the vehicle starts, and a fluid-pressure controlling means controllable by said clutch control member, for regulating said temporary excess engine-power.

23. In a motor-vehicle, the combination with an engine for propelling the vehicle, an engine-motive fluid controller and a governor for controlling the power of said engine, of mechanism for selectively setting the engine-power in excess of the idle engine-power, and a fluid-pressure control device controllable by the brake control member or the clutch control member, for selectively reducing said excess engine-power.

24. In a motor-vehicle having a brake control member, a clutch control member for controlling engagement and disengagement of the vehicle-engine with said vehicle, and a governor for controlling the power of the vehicle-engine, a mechanism for selectively setting the amount of engine-power in excess of the idle engine-power, and a current-controlling device controllable by the brake control member or the clutch control member, for selectively reducing said excess engine-power.

25. In a motor-vehicle, in combination, an inertia-controller appliance operative for varying electric current in a continuous proportion to magnitudes of acceleration of said vehicle, a fluid-control valve, electromagnetic-motor means for operating said valve, and electric circuit connections including a source of electric power, said electromagnetic motor means and said inertia-controller appliance.

26. The combination with a motor vehicle having an engine for propelling said vehicle, a power-transmission including a clutch and clutch control member, and an engine-motive fluid control means, of a vehicle-control device, having a fluid-pressure control means controllable by said clutch control member for controlling the vehicle-starting operation of said engine-motive fluid control means, and inertia-governor means for determining flow of engine-motive fluid responsively with longitudinal inclination of said vehicle, for starting the vehicle.

27. In a motor vehicle having an engine for propelling said vehicle, a clutch control member for controlling the engaging and disengaging of said engine with the vehicle, and an engine-motive fluid control means, a vehicle-control appliance having a fluid-pressure controlling means controllable by said clutch control member, regulating vehicle-starting operation of said engine-motive fluid control means, and an inertia operable member for determining amounts of power of said engine in excess of idle power responsively with longitudinal inclination of said vehicle, for starting the vehicle.

28. The combination with a motor vehicle having an engine for propelling said vehicle, a clutch control member for controlling the engaging and disengaging of said engine with the vehicle, and an engine-motive fluid controller, of a vehicle control device for regulating flow of engine-motive fluid through said engine-motive fluid controller to provide an excess of engine-power above idle engine-power, for starting the vehicle, including a fluid-pressure control means controllable by said clutch control member, regulating flow of engine-motive fluid, and inertia means associated with said fluid-pressure control means for determining flow of engine-motive fluid responsive with longitudinal inclination of said vehicle.

EDWARD H. LANGE.